US009322959B2

(12) United States Patent
Ueyama et al.

(10) Patent No.: US 9,322,959 B2
(45) Date of Patent: Apr. 26, 2016

(54) CONTACT LENSES MADE WITH HEMA-COMPATIBLE POLYSILOXANE MACROMERS

(71) Applicant: CooperVision International Holding Company, LP, St. Michael (BB)

(72) Inventors: Hiroyuki Ueyama, Nobeoka (JP); Charlie Chen, San Ramon, CA (US); Yuan Xu, Fremont, CA (US); Yuwen Liu, Dublin, CA (US); Ying Zheng, Pleasanton, CA (US); Paul Richardson, San Ramon, CA (US); Prasad Dande, Oakland, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 14/010,609

(22) Filed: Aug. 27, 2013

(65) Prior Publication Data

US 2014/0066540 A1    Mar. 6, 2014

Related U.S. Application Data

(60) Provisional application No. 61/786,761, filed on Mar. 15, 2013, provisional application No. 61/694,011, filed on Aug. 28, 2012.

(51) Int. Cl.
| | | |
|---|---|---|
| *G02B 1/04* | (2006.01) |
| *C08L 33/10* | (2006.01) |
| *C08L 83/12* | (2006.01) |
| *C08L 101/14* | (2006.01) |
| *C08L 83/04* | (2006.01) |
| *C08L 83/06* | (2006.01) |
| *C08G 77/442* | (2006.01) |
| *C08G 77/46* | (2006.01) |
| *C08G 77/32* | (2006.01) |

(52) U.S. Cl.
CPC ............... *G02B 1/043* (2013.01); *C08G 77/46* (2013.01); *C08L 83/12* (2013.01); *G02B 1/04* (2013.01); *C08G 77/442* (2013.01)

(58) Field of Classification Search
None
See application file for complete search history.

(56) References Cited

U.S. PATENT DOCUMENTS

| | | | | |
|---|---|---|---|---|
| 4,099,859 A * | 7/1978 | Merrill | ...................... | 351/159.33 |
| 4,139,513 A * | 2/1979 | Tanaka et al. | .................... | 522/99 |
| 4,153,641 A | 5/1979 | Deichert et al. | | |
| 4,259,467 A * | 3/1981 | Keogh et al. | ................... | 526/279 |
| 4,260,725 A * | 4/1981 | Keogh et al. | ................... | 526/279 |
| 4,740,533 A * | 4/1988 | Su et al. | ........................ | 523/106 |
| 5,260,000 A * | 11/1993 | Nandu et al. | .................... | 264/2.1 |
| 2002/0016383 A1 | 2/2002 | Iwata et al. | | |
| 2004/0246436 A1 | 12/2004 | Turek et al. | | |
| 2007/0142584 A1 | 6/2007 | Schorzman et al. | | |
| 2009/0234089 A1* | 9/2009 | Ueyama et al. | ................ | 526/279 |
| 2011/0085128 A1* | 4/2011 | Liu et al. | ..................... | 351/160 H |
| 2014/0022507 A1 | 1/2014 | Nicolson et al. | | |

FOREIGN PATENT DOCUMENTS

| | | |
|---|---|---|
| CN | 102617787 A | 8/2012 |
| JP | 10-072525 A | 3/1998 |

OTHER PUBLICATIONS

International Preliminary Report on Patentability issued in corresponding International Patent Application No. PCT/GB2013/052244 dated Oct. 29, 2014 (12 pages).

Communication Relating to the Results of the Partial International Search issued in corresponding International Patent Application No. PCT/GB2013/052244 dated Nov. 11, 2013 (2 pages).

Office Action received in corresponding Japanese Patent Application No. 2015-529118 dated Aug. 3, 2015 with English translation (5 pages).

* cited by examiner

*Primary Examiner* — Peter A Salamon
(74) *Attorney, Agent, or Firm* — Kilyk & Bowersox, P.L.L.C.

(57) ABSTRACT

Optically clear silicone hydrogel contact lenses are described that comprise a polymeric lens body that is the reaction product of a polymerizable composition comprising at least 25 wt. % of at least one hydroxyalkyl methacrylate; and at least 20 wt. % of at least one HEMA-compatible bifunctional polysiloxane comprising at least 6 siloxane groups and having an HLB value of at least 5 and/or a hydroxyl group content of at least 1 wt. %.

13 Claims, No Drawings

CONTACT LENSES MADE WITH HEMA-COMPATIBLE POLYSILOXANE MACROMERS

This application claims the benefit under 35 U.S.C. §119 (e) of prior U.S. Provisional Patent Application Nos. 61/694,011, filed Aug. 28, 2012, and 61/786,761, filed Mar. 15, 2013, which are incorporated in their entireties by reference herein.

BACKGROUND

The field of the disclosure is contact lenses formed from copolymerization of a hydroxyalkyl methacrylate with a HEMA-compatible bifunctional polysiloxane.

2-hydroxyethyl methacrylate (HEMA) is a biocompatible, polymerizable monomer that has been used for over the past forty years to make soft hydrogel contact lenses. HEMA-based hydrogel contact lenses are much more comfortable to wear than their rigid predecessors. However, a drawback of the HEMA-based hydrogel lenses is that they have low oxygen permeability. It was recognized that materials that provide higher oxygen permeability would be healthier for the cornea. In the late 1990s silicone hydrogel contact lenses, which have significantly higher oxygen permeability than HEMA-based hydrogel lenses, were introduced to the market. However, the siloxane monomers used to make silicone hydrogels are typically much more expensive than HEMA. In addition, the methods used to make silicone hydrogel contact lenses are substantially more complex and labor-intensive than for HEMA-based hydrogel contact lenses. It would be desirable to combine the benefits of HEMA with the oxygen permeability attributes of silicone hydrogels, however HEMA is very hydrophilic and is generally not miscible with silicone monomers.

Background publications include U.S. Pat. Nos. 8,053,544, 8,129,442, 4,260,725, U.S. Pat. Publ. No. 2011/0181833, U.S. Pat. Publ. No. 20060063852, and U.S. Pat. Publ. No. 2011/0140292.

SUMMARY

We have discovered HEMA-compatible siloxane monomers that can be used to manufacture contact lenses that combine the attributes of HEMA-based contact lenses with the high oxygen permeability of silicone hydrogel lenses.

Disclosed herein are optically clear silicone hydrogel contact lenses comprising a polymeric lens body that is the reaction product of a polymerizable composition comprising at least 25 wt. % of at least one hydroxyalkyl methacrylate and at least 20 wt. % of at least one HEMA-compatible bifunctional polysiloxane. The polysiloxane is bifunctional in that it comprises either two polymerizable acrylate or meth(acrylate) groups. The polysiloxane further comprises at least 6 siloxane groups and i) has an HLB value of at least 5, or ii) has a hydroxyl group content of at least 1 wt. %, or iii) has both an HLB value of at least 5 and a hydroxyl group content of at least 1 wt. %. The contact lenses may have any of the additional feature or any combination of non mutually-exclusive additional features described as examples in the following paragraphs.

In one example, the HEMA-compatible bifunctional polysiloxane has a molecular weight of 1K to 20K.

In another example, the HEMA-compatible bifunctional polysiloxane has an elemental silicon content of at least 10 wt. %, optionally combined with the above-described molecular weight feature.

In a specific example, optionally combined with one or both of the above additional features, the HEMA-compatible bifunctional polysiloxane has the structure of Formula 1:

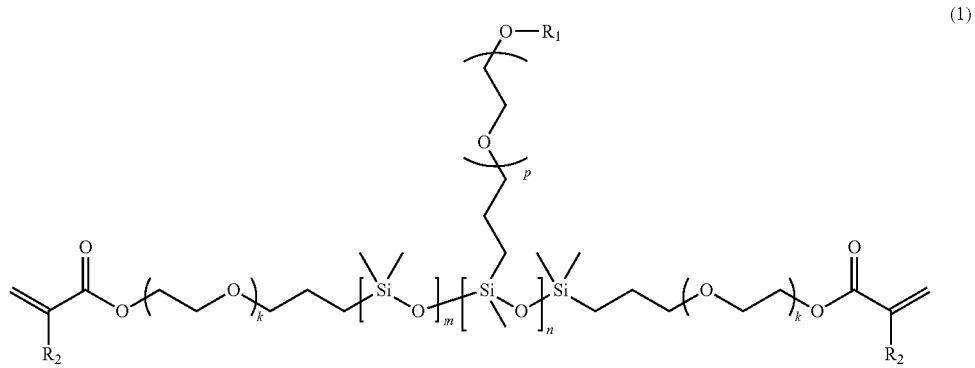

(1)

wherein $R_1$ and $R_2$ are independently selected from either hydrogen or a methyl group, k is an integer of 0 or 1, m is an integer of at least 6, n is an integer of at least 1, p is an integer of at least 1, and $R_1$ is either hydrogen or a methyl group. In a further example, m is an integer of 6 to 100, n is an integer of 1 to 75, and p is an integer of 1 to 40. In yet a further example, m is an integer of 6 to 60, n is an integer of 1 to 10, and p is an integer of 10 to 30. And in still a further example, m is an integer of 30 to 60, n is an integer 30 to 60, p is an integer of 1 to 6, and $R_1$ is hydrogen.

In one example, the HEMA-compatible bifunctional polysiloxane has an HLB value of at least 7. In another example, the HEMA-compatible bifunctional polysiloxane has an HLB value of less than 5 and a hydroxyl group content of at least 1 wt. %. In yet another example, the HEMA-compatible bifunctional polysiloxane has an HLB value of 2 to 4 and hydroxyl group content of 4 to 8 wt. %.

The polymerizable composition used to make the contact lenses of any of the above-described examples or combination of examples may further comprise 1 to 65 wt. % diluent, wherein the diluent comprises water, a low molecular weight polyethylene glycol (PEG), or a combination thereof. In specific examples, the HEMA-compatible bifunctional polysiloxane requires water addition for optical clarity.

In any of the preceding examples or combination of examples, the polymerizable composition may further comprise 0.1 to 5 wt. % methacrylic acid.

In any of the preceding examples or combination of examples, the polymerizable composition may comprise at least 35 wt. % of the hydroxyalkyl methacrylate.

In any of the preceding examples or combination of examples, the hydroxyalkyl methacrylate may be 2-hydroxyethyl methacrylate (HEMA).

In any of the preceding examples or combination of examples, the contact lens may have a Dk of at least 35. In a further example, the HEMA-compatible bifunctional polysiloxane provides the contact lens with at least a 50% increase in oxygen permeability.

Also disclosed herein is a method of manufacturing an optically clear contact lens as set forth in any of the above examples or combination of examples. The method comprises polymerizing a polymerizable composition to form a polymeric lens body and hydrating the polymeric lens body, wherein the polymerizable composition comprises at least 25 wt. % of at least one hydroxyalkyl methacrylate and at least 20 wt. % of at least one HEMA-compatible bifunctional polysiloxane, and wherein the polymerizable composition is either diluent-free or comprises about 1 to 65 wt. % of a diluent consisting essentially of water or a low molecular weight PEG, or a combination thereof. In a specific example of the method, the polymeric lens body does not come in contact with a volatile organic solvent during the hydrating step. In a further example, the polymerizing step comprises thermal curing in air.

Also disclosed herein is a composition comprising a polysiloxane of Formula 3:

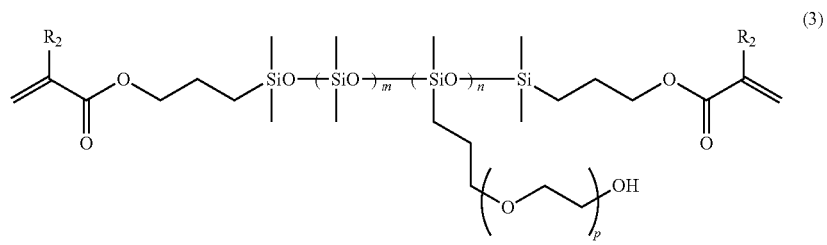

wherein $R_2$ is selected from either hydrogen or a methyl group, m is an integer of 6 to 50, n is an integer of 1 to 6, and p is an integer of 8 to 20, and wherein the composition comprises at least 75% of the polysiloxane and is miscible in HEMA to at least 20 wt. %. In a specific example, the composition comprises a polysiloxane of Formula 3 wherein $R_2$ is a methyl group, m is an integer of 6 to 25, n is an integer of 1 to 4, and p is an integer of 12 to 18.

DETAILED DESCRIPTION

As a result of extensive research, we have developed HEMA-compatible polysiloxane macromers that can be used to manufacture optically clear silicone hydrogel contact lenses having a high HEMA content. Accordingly, contact lenses can be manufactured using, the polysiloxane macromers disclosed herein together with HEMA, or other hydroxyalkyl(meth)acrylate, thereby combining the benefits of HEMA with the oxygen permeability attributes of silicone hydrogels. The polysiloxane is bifunctional, which, as used herein, means that it comprises two polymerizable acrylate or meth(acrylate) groups. It also comprises at least 6 siloxane (SiO) groups, and has an HLB value of at least 5 and/or a hydroxyl group content of at least 1 wt. %.

By HEMA-compatible, it is meant that the bifunctional polysiloxane forms an optically clear lens made from the following test formulation and procedure. The test formulation consists essentially of a mixture of 20 parts of the bifunctional polysiloxane, 80 parts HEMA, 0.5 parts ethylene glycol dimethacrylate (EGDMA), 0.5 parts of the polymerization initiator 2,2'-azobis(2,4-dimethylpentanenitrile) (V52), optionally 0.1 to 2 parts methacrylic acid (MA), and optionally 0.1 to 30 parts water, where parts are by weight based on the total weight of the test formulation, which is a polymerizable composition. The test formulation is cured in a polypropylene contact lens mold at 80° C. for one hour. After cure, the mold is opened and the resulting polymeric lens body is either mechanically removed from the mold (i.e. dry-delensed) or is wet-delensed by immersing the mold in water until the polymeric lens body hydrates and floats off of the mold. After delensing, the polymeric lens body is then placed into fresh room temperature water for 20 minutes, then placed in a contact lens blister containing 1.8 ml phosphate buffered saline (PBS), sealed, and sterilized by autoclave. If the resulting lens is optically clear after autoclave, the polysiloxane is demonstrated to be miscible in HEMA to at least 20 wt. % and is thus considered to be HEMA-compatible. A lens is considered optically clear if it exhibits at least 90% light transmittance between 381 nm to 780 nm (measured in accordance with ISO 18369). If a bifunctional polysiloxane results in a clear lens using the above method except that the formulation has 30 parts of the polysiloxane and 70 parts HEMA, the polysiloxane is said to be miscible in HEMA to at least 30 wt. %. In various examples, the bifunctional polysiloxanes described herein are at least 25, 30, 35, 40, 45, or 50 wt. % miscible in HEMA. Throughout this disclosure a reference to "examples", "an example" or "a specific example" or similar phrase, is intended to introduce a feature or features of the contact lens, HEMA-compatible polysiloxane, polymerizable composition, or method of manufacture (depending on context) that can be combined with any combination of previously-described or subsequently-described examples (i.e. features), unless a particular combination of features is mutually exclusive, or if context indicates otherwise.

Some of the HEMA-compatible polysiloxanes described herein are miscible in the above test formulation (i.e. the mixture is clear) without addition of any water, but result in a cloudy lens after curing and hydration. We discovered that by adding water to the polymerizable composition, the resulting lens will be optically clear. In such examples, the HEMA-compatible polysiloxane is said to require water addition for HEMA compatibility, though it will be appreciated that other diluents besides water may also result in an optically clear lens. Thus, in various examples, the polymerizable composition additionally comprises from about 1, 5 or 10 wt. % up to about 30, 50, or 65 wt. % of a diluent, wherein the wt. % of the diluent is based on the total weight of the polymerizable composition. As used herein, the term diluent refers to a non-polymerizable component of the polymerizable composition that is added to compatibilize (i.e. make miscible) the polysiloxane with the HEMA (or other hydroxyalkyl methacrylate). In some examples, the diluent consists essentially of water, a low molecular weight polyethylene glycol (PEG), or a combination thereof. As used herein, a low molecular weight PEG has an average molecular weight of less than about 1500, and in some examples, has an average molecular weight of less than about 1200, 1000, or 800. In some examples, the HEMA-compatible polysiloxane may be prepared by a hydrosilyation reaction in which a side chain derived from a low molecular weight reactive PEG, such as hydroxyl polyethylene glycol allyl ether, is attached to a polysiloxane as described in Example 2 below. In such examples, the hydrosilyation reaction product may comprise at least 70, 75 or 80 wt. % of the HEMA-compatible polysiloxane, with the remaining components being PEG and the reactive PEG (e.g. OH-PEG allyl ether). In such examples, the PEG and the OH-PEG allyl ether can be removed from the HEMA-compatible polysiloxane by further purification to provide a HEMA-compatible polysiloxane having a purity of at least 85, 90, or 95 wt. %. An exemplary purification method is described below and in Example 6. Alternatively, the PEG and reactive PEG can remain to function as a low molecular weight PEG diluent in the polymerizable composition. Thus, the term "low molecular weight PEG diluent" encompasses reactive PEGs (e.g. OH-PEG allyl ether) having an average molecular weight of ≤1500 that are used in preparing the polysiloxane. In specific examples, the diluent is substantially free of non-polymerizable polysiloxane-containing components, such as polysiloxane surfactants, silicone oils, or other diluents known for use in silicone hydrogel contact lens formulations. An advantage of the water and low molecular weight PEG diluents described herein is that the contact lens can be made without the use of volatile solvents.

The hydrophilicity of a silicone macromer is represented by its hydrophilic-lipophilic balance (HLB) value, which is calculated as twenty times the molecular weight of the hydrophilic portion of the polysiloxane divided by the total molecular weight of the polysiloxane. For example, a HEMA-compatible polysiloxane may have the structure shown in Formula 1, where $R_1$ is hydrogen. In such examples, the polyethylene oxide (PEO; —$CH_2CH_2O$—) groups and the terminal hydroxyl (—OH) groups make up the hydrophilic portion of the polysiloxane. An example of one such polysiloxane is described in Example 2 below, designated H10P16, and is represented by Formula 1 below wherein k is 0, m is 19.7, n is 2.5, p is 16, $R_1$ is hydrogen, and $R_2$ is a methyl group.

"molecular weight" refers to the absolute number average molecular weight (in units of Daltons) of the monomer as determined by $^1$H NMR end-group analysis (NMR). Similarly, the values of m, n, and p values are average values as determined by NMR. Thus, in various examples, the HLB value of the polysiloxane is at least 6, 7, or 8, and up to about 10, 11, or 12. It will be appreciated that the polysiloxane may comprise hydrophilic groups instead of, or in addition to, the PEO and/or hydroxyl groups that contribute to the HLB value. Examples of such additional groups include urethane groups, amide groups, and diol groups.

Throughout this disclosure, when a series of lower limit ranges and a series of upper limit ranges are provided, all combinations of the provided ranges are contemplated as if each combination were specifically listed. For example, in the listing of HLB values above, all 9 possible HLB ranges are contemplated (i.e. 6-10, 6-11 . . . 8-11, and 8-12). Also, throughout this disclosure, when a series of values is presented with a qualifier preceding the first value, the qualifier is intended to implicitly precede each value in the series unless context dictates otherwise. For example, for the above HLB values, it is intended that the qualifier "at least" implicitly precedes both 7 and 8, and the qualifier "to about" implicitly precedes both 11 and 12.

While the HEMA-compatibility of a polysiloxane is determined using a test formulation in the manner described above, the polymerizable compositions used to make the contact lenses described herein may comprise monomers in addition to hydroxyalkyl methacrylate provided that the composition comprises at least 25 wt. % of at least one hydroxyalkyl methacrylate, and at least 20 wt. % of at least one HEMA-compatible bifunctional polysiloxane comprising at least 6 siloxane groups and having an HLB value of at least 5 and/or comprising a hydroxyl group content of at least 1 wt. %. As used herein, a wt. % of a monomer (i.e. the hydroxyalkyl methacrylate, the HEMA-compatible polysiloxane, and any other polymerizable component of the polymerizable composition) is based on the total weight of polymerizable monomers in the composition, i.e. excluding diluents and any other non-polymerizable component.

The hydroxyalkyl methacrylate may be any lower hydroxyalkyl methacrylate suitable for use in contact lenses. In specific examples, the hydroxyalkyl methacrylate is selected from HEMA, 2-hydroxybutyl methacrylate (HOB), 2-hydroxypropyl methacrylate (HOP), and combinations thereof. For example, in the case of a composition that com- (1)

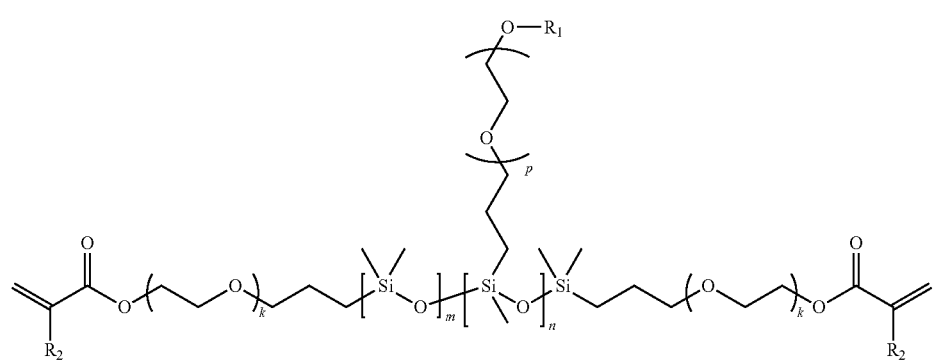

Thus, based on these values, the HLB value for H10P16 is calculated to be about 10.9. In the case of polydisperse molecules, such as the polysiloxanes described herein, the term prises 10 wt. % HOB and 15 wt. % HOP, the composition is said to comprise 25 wt. % of at least one hydroxyalkyl methacrylate. In other words, the composition may comprise a combination of hydroxyalkyl methacrylates provided that their combined total is at least 25 wt. %. Similarly, the composition may comprise a combination of two or more HEMA-compatible, bifunctional polysiloxanes having an HLB value of at least 5 and/or comprising a hydroxyl group content of at least 1 wt. %, provided that their combined total in the composition is at least 20 wt. %. Thus, reference to "a", "an" or "the" monomer of a particular type (e.g. "the HEMA-compatible polysiloxane" or "a hydroxyalkyl methacrylate") is meant to encompass "one or more" of said type of monomer unless context dictates otherwise. In various examples, the polymerizable composition comprises at least 30, 35 or 40 wt. % of the hydroxyalkyl methacrylate and at least 25, 30, or 35 wt. % of the HEMA-compatible polysiloxane. Other monomers may be included in the polymerizable composition in addition to the hydroxyalkyl methacrylate and the HEMA-compatible polysiloxane. Exemplary additional monomers include N-vinyl-N-methyl acetamide (VMA), N-vinyl pyrrolidone (NVP), 1,4-butanediol vinyl ether (BVE), ethylene glycol vinyl ether (EGVE), diethylene glycol vinyl ether (DEGVE), N,N-dimethylacrylamide (DMA), methyl methacrylate (MMA), ethoxyethyl methacrylamide (EOEMA), ethylene glycol methyl ether methacrylate (EGMA), isobornyl methacrylate (IBM), glycerol methacrylate (GMA), methacrylic acid (MA), acrylic acid (AA) or any combination of two or more of the foregoing additional monomers. In a specific example, the polymerizable composition comprises from about 0.1, 0.5, 1 wt. % up to about 2, 3, or 5 wt. % MA or AA.

A polymerizable siloxane that is not necessarily HEMA-compatible, as defined above, may also be included in the polymerizable composition up to an amount in which the additional polymerizable siloxane remains miscible such that the resulting lens is optically clear. Examples of additional polymerizable siloxanes include 3-[tris(trimethylsiloxy)silyl]propyl methacrylate ("TRIS"), 3-methacryloxy-2-hydroxypropyloxy)propylbis(trimethylsiloxy)methylsilane ("SiGMA"), methyldi(trimethylsiloxy)sylylpropylglycerolethyl methacrylate ("SiGEMA"), and monomethacryloxypropyl functional polydimethylsiloxanes such as MCR-M07 and MCS-M11, all available from Gelest (Morrisville, Pa., USA). Other polymerizable siloxanes are known in the field (see e.g. U.S. Pat. Nos. 7,572,841, 5,998,498, 5,965,631, U.S. Pat. Pub. No. 2006/0063852, U.S. Pub. No. 2007/0296914, U.S. Publ. No. 2009/0299022, U.S. Pat. Nos. 6,310,169, and 6,867,245, each incorporated herein by reference).

Although the HEMA-compatible siloxane is bifunctional, and thus functions in the polymerizable composition as a cross-linker, an additional cross-linker may be included in the polymerizable composition to achieve a hydrogel having the physical properties suitable for contact lenses. Various cross-linkers are known in the art. Exemplary cross-linkers are triethylene glycol dimethacrylate (TEGDMA) and ethylene glycol dimethacrylate (EGDMA).

Typically the polymerizable composition will additionally include a coloring agent such as a tint (e.g. Vat Blue 6) or a polymerizable dye (e.g. RB19-HEMA; see e.g. WO201302839). In specific examples, the polymerizable composition consists of: (a) the HEMA-compatible polysiloxane, (b) the hydroxyalkyl methacrylate, (c) a monomer selected from methacrylic acid, or acrylic acid, or glycerol methacrylate, or a combination thereof, and optionally (d) a cross-linker agent and/or a polymerizable dye, and no other polymerizable components.

There is no particular size constraint to the HEMA-compatible polysiloxanes described herein, but typically, they will have a molecular weight of at least 1K, 2K, or 3K, up to about 10K, 20K, or 30K. In some examples, the silicone content of the HEMA-compatible polysiloxane is selected to provide the contact lens with an increase in oxygen permeability of at least 25%, 50%, 75%, or 100% compared to a comparable HEMA lens, where oxygen permeability (Dk) of the contact lens is measured in barrers using standard methods in the industry, such as by the method described by Chhabra et al. (2007), *A single-lens polarographic measurement of oxygen permeability (Dk) for hypertransmissible soft contact lenses*. Biomaterials 28: 4331-4342. For example, if a contact lens made with a HEMA-compatible bifunctional polysiloxane, as described herein, has a Dk of 30 and a comparable HEMA contact lens has a Dk of 15, the HEMA-compatible polysiloxane is said provide the contact lens with a 100% increase in oxygen permeability as determined by the equation: % increase=$[(Dk_H-Dk_C)/Dk_C]\times 100$, where $Dk_H$ and $Dk_C$ are the Dk values of the HEMA-compatible polysiloxane-containing lens and the comparable HEMA contact lens, respectively. As used herein, a "comparable HEMA contact lens" is made from a polymerizable composition in which the HEMA-compatible bifunctional polysiloxane is replaced by HEMA and optionally methacrylic acid, but is otherwise substantially identical. If needed, methacrylic acid is added to the comparative formulation in an amount to provide the resulting comparative lens with an equilibrium water content (EWC) similar to the HEMA-compatible polysiloxane-containing lens. To measure EWC, excess surface water is wiped off of the lens and the lens is weighed to obtain the hydrated weight. The lens is dried in an oven at 80° C. under a vacuum, and weighed. The weight difference is determined by subtracting the weight of the dry lens from the weight of the hydrated lens. The % EWC of the lens is = (weight difference/hydrated weight)×100. In various examples, the HEMA-compatible polysiloxane has an average elemental silicon content of at least 8, 10, 12, 14, 16, 18, or 20 wt. % relative to the average molecular weight of the HEMA-compatible polysiloxane. In further examples, the HEMA-compatible polysiloxane-containing contact lens has an EWC of at least 30, 40 or 50 wt. % and up to about 60 or 70 wt. %.

Exemplary HEMA-compatible bifunctional polysiloxanes, as noted above, comprise polyethylene oxide (PEO) groups, typically either as a side chain to one or more of the siloxane groups (e.g. such as the p groups in Formula 1), and/or as groupings adjacent the functional (i.e. polymerizable) ends of the polysiloxane (e.g. such as the k groups in Formula 1). Methods of making polysiloxanes comprising PEO groups are described in U.S. Pat. Nos. 8,053,544, 8,129,442, and U.S. Pat. Publ. No. 2011/0140292. In a particular example, the HEMA-compatible polysiloxane has the structure of Formula 1, above, wherein k is an integer of 0 or 1, m is an integer of at least 6, n is an integer of at least 1, p is an integer of at least 1, and $R_1$ and $R_2$ are independently selected from either hydrogen or a methyl group. In various such examples, m is an integer of at least 10, 15, 20, or 30 up to about 50, 60, 80, or 100; n is an integer of at least 1, 2, or 4 up to about 6, 8, 10, or 12. In another example, m is an integer within the aforementioned ranges, and n is an integer of at least 10, 15, or 30 up to about 40, 60, or 80. In various examples, k, m, and p are any of the aforementioned values, and $R_1$ is hydrogen. In such examples, the polysiloxane may have a hydroxyl group content of at least 1 wt. %. In some examples, the HEMA-compatible polysiloxane has an average hydroxyl group content of from about 1, 2, or 3 wt. % up to about 5, 7, 10, or 15 wt. %, wherein the wt. % of the —OH groups is based on the average molecular weight of the polysiloxane. We have found that polysiloxanes with relatively high hydroxyl group content can be HEMA-compatible despite having relatively low HLB values. Thus, in various examples, the polysiloxane has an HLB value of 1, 2, 3 up to 5, 6, 7, or 8 and has a hydroxyl group content of from about 1, 2, or 3 wt. % up to about 5, 7, or 10 wt. %. In a specific example, the polysiloxane has an HLB value of 3 to 5 and a hydroxyl group content of about 4 to 8 wt. %. As an example, a polysiloxane of Formula 1, wherein k is 0, $R_1$ is hydrogen, $R_2$ is a methyl group, m is 71, n is 50, and p is 1, has a hydroxyl group content of about 6%, an HLB value of about 4, and is HEMA-compatible as defined above without requiring water addition. In various other examples, the polysiloxane has the structure of Formula 1 wherein k is 0, $R_1$ is hydrogen, $R_2$ is either hydrogen or a methyl group, m is an integer of 6 to 100, n is an integer of 1 to 75, and p is an integer of 1 to 40. In another example, the polysiloxane has the structure of Formula 1 wherein k is 0, $R_1$ is hydrogen, $R_2$ is either hydrogen or a methyl group, m is an integer of 6 to 60, n is an integer of 1 to 10, and p is an integer of 10 to 30.

Methods for making the HEMA-compatible polysiloxanes and contact lenses comprising them are described in the Examples below. In a specific method, an intermediate polysiloxane of Formula 2:

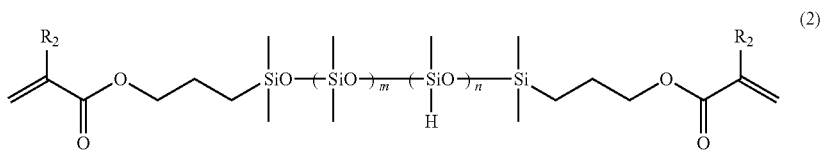

(2)

wherein $R_2$ is either hydrogen or a methyl group, is prepared by reacting octamethylcyclotetrasiloxane, 1,3,5,7-tetramethylcyclotetrasiloxane and 1,3-bis(3-methacryloxypropyl)-1,1,3,3-tetramethyldisiloxane and trifluoromethanesulfonic acid, and neutralizing the reaction with magnesium oxide. Next, a hydrosilyation reaction is used to attach a PEO-containing side chain to the intermediate polysiloxane of Formula 2 to form a HEMA-compatible polysiloxane of Formula (3)

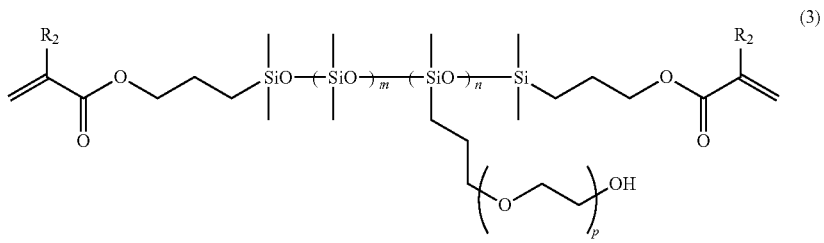

(3)

in which $R_2$ is hydrogen or a methyl group, and m, n, and p, have any of the values or combination of values indicated in the previous paragraphs. In a specific example, the HEMA-compatible polysiloxane has a structure represented by Formula (3), wherein $R_2$ is a methyl group, m is an integer of 6 to 50, n is an integer of 1 to 6, and p is an integer of 8 to 20, and is miscible in HEMA to at least 30 wt. %. In a further example, the polysiloxane has a structure represented by Formula (3) wherein $R_2$ is a methyl group, m is an integer of 6 to 25, n is an integer of 1 to 4, and p is an integer of 12 to 18.

In various other examples, the HEMA-compatible bifunctional polysiloxane has the structure of Formula 4:

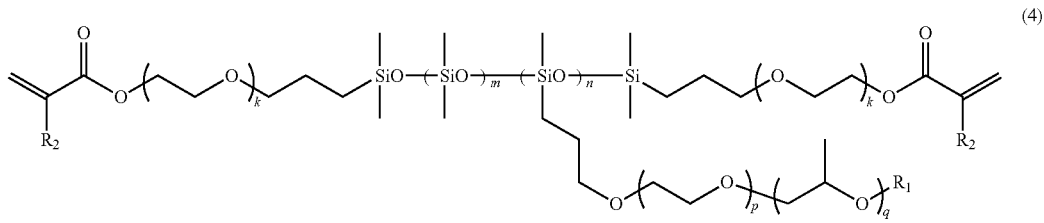

(4)

wherein $R_1$ and $R_2$ are independently selected from either hydrogen or a methyl group, k is an integer of 0 or 1, m is an integer of 0 to 160, n is an integer of 1 to 75, p is an integer of 0 to 40, and q is an integer of 0 to 20. In a specific example, m is an integer of 6 to 100, n is an integer of 1 to 75, p is an integer of 1 to 40, and q is 0. In a further specific example, m is an integer of 6 to 60, n is an integer of 1 to 10, p is an integer of 10 to 30, and q is 0.

In some examples, the HEMA-compatible bifunctional polysiloxane has the structure of Formula 4, wherein m is 0, i.e. the polysiloxane does not contain any polydimethylsiloxane (PDMS). In various such examples, the polysiloxane has the structure of Formula 4 wherein m is 0, n is an integer of 10 to 60, p is an integer of 0 to 6, q is 0, and $R_1$ is hydrogen. In a further example, the polysiloxane has the structure of Formula 4 wherein m is 0, n is an integer of 20 to 40, and p is 0. Examples 8-10 below describe methods of synthesizing HEMA-compatible bifunctional polysiloxanes having no PDMS.

In other examples, the HEMA-compatible bifunctional polysiloxane comprises a side chain comprising units of ethylene oxide and propylene oxide. In one such example, the HEMA-compatible bifunctional polysiloxane has the structure of Formula 4, wherein m is an integer of 6 to 60, n is an integer of 1 to 10, p is an integer of 1 to 40, and q is an integer of 1 to 10. In a further example, the HEMA-compatible bifunctional polysiloxane has the structure of Formula 4, wherein m is an integer of 6 to 50, n is an integer of 1 to 6, p is an integer of 8 to 20, and q is an integer of 2 to 8. The synthesis of one such exemplary polysiloxane is described in Example 7.

Provided herein are methods of purifying the HEMA-compatible bifunctional polysiloxanes to remove unreacted PEG-containing reagents (e.g. OH-PEG allyl ether, PEG-polypropyleneglycol allyl ether, etc.). In an exemplary method, the hydrosilyation reaction product (e.g. the HEMA-compatible polysiloxane, unreacted polyethylene glycol-containing reagent, and any other unreacted reagent) is combined with an organic solvent and water, or with an organic solvent and an aqueous solution, to make a mixture. Suitable organic solvents include ethyl acetate, dichloromethane, and the like. Suitable aqueous solutions include saline solution, sodium citrate, and the like. Agitation, such as vortexing or vigorous stirring, can be used to facilitate mixing the organic and aqueous phases. Next, the mixture is allowed to equilibrate into an organic layer and an aqueous layer comprising unreacted PEG-containing reagents. Centrifigation can be used in the equilibrating step to facilitate the phase separation. The aqueous layer is then discarded from the organic layer. The polysiloxane may be isolated from the organic layer using standard techniques such as removing residual aqueous solution using dehydrating agents such as anhydrous sodium sulfate, and removing organic solvent using air/gas flow, reduced pressure, increased temperature and/or a combination of these and other techniques. Optionally, the organic layer may be recombined with water or aqueous solution and the equilibrating and discarding steps repeated one or more times until the desired degree of purity is reached. In various examples, the HEMA-compatible bifunctional polysiloxane is purified to at least 85 wt. %, 90 wt. %, 95 wt. %, 98 wt. %, or 99 wt. %.

Optically clear contact lenses can be made from the HEMA-compatible bifunctional polysiloxanes described herein using curing and other processing methods known in the field. An exemplary method comprises preparing a polymerizable composition comprising at least 25 wt. % of at least one hydroxyalkyl methacrylate, at least 20 wt. % of a HEMA-compatible bifunctional polysiloxane, a polymerization initiator, and optionally 1 to 65 wt. % diluent. The polymerizable composition is filled into a contact lens mold, which is typically made from a thermoplastic polymer such as polypropylene. Typically, a first mold member defining the front surface of the contact lens, referred to as a "female mold member", is filled with an amount of the polymerizable composition sufficient to form a single polymeric lens body. A second mold member defining the back (i.e. eye-contacting) surface of the contact lens, referred to as the "male mold member", is coupled to the female mold member to form a mold assembly having a lens-shaped cavity with the amount of polymerizable composition therebetween. The polymerizable composition within the contact lens mold assembly is then polymerized using any suitable curing method. Typically, the polymerizable composition is exposed to polymerizing amounts of heat or ultraviolet light (UV). In the case of UV-curing, also referred to as photopolymerization, the polymerizable composition typically comprises a photoinitiator such as benzoin methyl ether, 1-hydroxycyclohexylphenyl ketone, Darocur or Irgacur (available from Ciba Specialty Chemicals). Photopolymerization methods for contact lenses are described in U.S. Pat. No. 5,760,100. In the case of heat-curing, also referred to as thermal curing, the polymerizable composition typically comprises a thermal initiator. Exemplary thermal initiators include 2,2'-azobis(2,4-dimethylpentanenitrile) (V-52), 2,2'-Azobis(2-methylpropanenitrile) (V-64), and 1,1'-azo bis(cyanocyclohexane) (V-88). In some examples, the polymerizable composition is thermally cured in a nitrogen oven. In a specific example, the polymerizable composition comprises V-52 and is cured at about 80° C. in air for about 1 hour.

At the completion of curing, the polymerized material between the mold members of the mold assembly has the shape of a contact lens, and is referred to herein as a "polymeric lens body". The male and female mold members are demolded, i.e. separated, and the polymeric lens body is removed, i.e. delensed, from the mold member to which it is adhered. These processes are referred to as demolding and delensing, respectively, and a variety of such methods are known to those of ordinary skill in the field. In some methods, the demolding and delensing processes can comprise a single process step, such as when the molds are separated using a liquid which also removes the polymeric lens body from the mold. In other methods, such as when a dry-demolding process is used, the polymeric lens body typically remains on one of the mold members and is delensed in a subsequent process step. Delensing can also be a wet or dry process. In one example, delensing is carried out by a "float off" method in which the mold member to which a polymeric lens body is adhered is immersed in water. The water may optionally be heated (e.g. up to about 100° C.). Typically, the polymeric lens bodies float off of the mold members in about ten minutes. In a specific example, the polymeric lens body is dry-delensed from the mold prior to hydrating the polymeric lens body. Dry delensing can be carried out manually, for example using tweezers to remove the polymeric lens bodies from the mold member, or they can be removed using an automated mechanical process, such as described in U.S. Pat. No. 7,811,483. Additional demolding and delensing methods for silicone hydrogel contact lenses are described in U.S. Pat. Publ. No. 2007/0035049.

After delensing, the polymeric lens body is washed to remove unreacted or partially reacted ingredients from the polymeric lens body and to hydrate the polymeric lens body. In a specific example, the polymeric lens body is washed in a washing liquid free of volatile organic solvents (e.g. methanol, ethanol, chloroform, etc.), and all liquids used to wash the polymeric lens body are free of volatile organic solvents. This type of washing may also be referred to herein as "organic solvent-free extraction" where "organic solvent" refers to volatile organic solvents. For example, a washing step that uses aqueous solutions of surfactants such as Tween 80, without any volatile organic solvents, is considered to be a volatile organic solvent-free extraction. In a further example, the polymeric lens body is not contacted by any volatile organic solvents during the manufacturing process (i.e. from the time curing of the polymeric lens body is complete until the time it is sealed in its final packaging). While the polymerizable compositions described herein can be used to make polymeric lenses bodies that can be washed without the use of volatile organic solvents, if desired, they can also be washed with organic solvents. Thus, washing steps can include contacting the polymeric lens body with a volatile organic solvent, such as a lower alcohol (e.g. methanol, ethanol, etc.), contacting the polymeric lens body with aqueous liquids that may or may not contain a volatile organic solvents, solutes, or combinations thereof. Exemplary washing methods are described in U.S. Pat. Publ. No. 2007/0296914 and in Example 3 below.

After washing, and any optional surface modifications, the hydrated polymeric lens body is typically placed into a blister package, glass vial, or other appropriate container, all referred to herein as "packages", which contains a packaging solution, which is typically a buffered saline solution such as phosphate- or borate-buffered saline. The packaging solution may optionally contain additional ingredients such as a comfort agent, a hydrophilic polymer, a surfactant or other additive that prevents the lens from sticking to the container, etc. The package is sealed, and the sealed polymeric lens body is sterilized by sterilizing amounts of radiation, including heat or steam, such as by autoclaving, gamma radiation, e-beam radiation, ultraviolet radiation, etc. The final product is a sterile, packaged optically clear silicone hydrogel contact lens.

The following Examples illustrate certain aspects and advantages of the present invention, which should be understood not to be limited thereby.

EXAMPLE 1

Preparation of Polysiloxane Intermediate 202.20 g of octamethylcyclotetrasiloxane (LS8620, Shin-Etsu Chemical), 21.87 g of 1,3,5,7-tetramethylcyclotetrasiloxane (LS8600, Shin-Etsu Chemical) and 56.63 g of 1,3-bis (3-methacryloxypropyl)-1,1,3,3-tetramethyldisiloxane (X-22-164, Shin-Etsu chemical) were added into 500 ml kjeldahl (eggplant-shaped) flask. To this solution 0.62 g of trifluoromethanesulfonic acid (Wako Pure Chemical Industries) was added and stirred at 35° C. for 3 h. After that 0.7025 g of magnesium oxide (light) (Wako Pure Chemical Industries) and 100 ml of hexane (anhydrous) were added and stirred for 1 h at room temperature. The reaction mixture was suction filtered through Celite No. 545 (Wako Pure Chemical Industries) and No. 5A KIRIYAMA filter paper. The filtrate was evaporated and vacuum-dried at 35° C. Afterward the reaction mixture was gradually heated up to 165° C. at 1~2 mmHg for 30 min while stirring, and the low molecule impurity was stripped off from the organic phase under reduced pressure (ca. 1 mmHg) at 165° C. for 2 h. The reaction yielded 253.27 g of an intermediate siloxane of Formula 2 (above).

EXAMPLE 2

Preparation of HEMA-Compatible Polysiloxane Macromer 60.01 g of the intermediate siloxane of Formula 2, 83.43 g of hydroxyl polyethylene glycol allyl ether having an average molecular weight of about 750 (Uniox PKA5004, NOF Corporation), 120.00 g of 2-propanol (super dehydrated) (Wako Pure Chemical Industries), 0.60 g of 10% potassium acetate (Wako Pure Chemical Industries) in ethanol, 1.36 g of 1% 2,6-di-t-butyl-4-methylphenol (Wako Pure Chemical Industries) in 2-propanol and 0.69 g of 1% p-methoxyphenol (Wako Pure Chemical Industries) in 2-propanol were added into 500 ml eggplant-shaped flask. To this solution 1.20 g of 1% hydrogen hexachloroplatinate (IV) hexahydrate in 2-propanol (hereinafter 1% H2PtCl6/6H20/IPA) was added and stirred at 50° C. for 2 h. After that the reaction mixture was evaporated and vacuum-dried at 35° C. for 2 h. The reaction yielded 146.05 g of which about 80% was a hydrophilic polysiloxane, designated H10P16, having the structure of Formula 3 (above) wherein $R_2$ is a methyl group, m is ~20, n is ~3, and p is ~16. The polysiloxane had an HLB value of about 10 and a hydroxyl group content of about 1.2 wt. %. The remaining components of the reaction product were about 16% allyl PEG and about 4% PEG.

EXAMPLE 3

Preparation of contact lenses using HEMA-compatible polysiloxane, H10P16

The components listed in Table 1 when mixed together formed a clear composition. The component designated H10P16 was prepared using the methods described in Example 2 above.

TABLE 1

| Component | Unit Parts by weight |
| --- | --- |
| H10P16 | 40 |
| HEMA | 60 |
| MA | 1.8 |
| TEGDMA | 0.1 |
| V52 | 0.5 |
| Water | 25 |

The mixture of Table 1 was filled into polypropylene contact lens molds and air cured at 80° C. for 1 hour. The molds were opened and the mold half retaining the cured polymeric lens body was immersed into room temperature water for 20 minutes. During this time, the lenses hydrated and detached from the mold half. The lenses were then placed into fresh water for another 20 minutes at room temperature, then placed into contact lens blisters containing 1.8 ml PBS, sealed and autoclaved. The resulting lenses were optically clear, had an equilibrium water content of about 55%, a Dk of about 38, and had acceptable physical properties and wettability.

EXAMPLE 4

Preparation of contact lenses using HEMA-compatible polysiloxane, H8P16

The components listed in Table 2 when mixed together formed a clear composition. The component designated H8P 16 is a reaction product prepared using the methods described in Example 2 above, except that the ratio of reactants was varied to provide a polysiloxane having a structure of Formula 3 wherein $R_2$ is a methyl group, m is ~54, n is ~7, and p is ~17.

TABLE 2

| Component | Unit Parts by weight |
| --- | --- |
| H8P16 | 40 |
| HEMA | 60 |
| MA | 1.8 |
| TEGDMA | 0.5 |
| V52 | 0.5 |
| Water | 25 |

The mixture of Table 2 was filled into contact lens molds, cured, and hydrated using the methods described in Example 3. The resulting lenses were optically clear, had an equilibrium water content of about 56%, a Dk of about 47, and had acceptable physical properties and wettability.

EXAMPLE 5

Preparation of Dry-Delensable Contact Lenses Using HEMA-Compatible Polysiloxane, H10P16

The components listed in Table 3 when mixed together formed a clear composition. The component designated H10P16 was prepared using the methods described in Example 2 above.

TABLE 3

| Component | Unit Parts by weight |
| --- | --- |
| H10P16 | 30 |
| HEMA | 50 |
| GMA | 15 |
| MA | 2.5 |
| TEGDMA | 0.5 |
| V52 | 0.8 |
| Water | 20 |

The mixture of Table 3 was filled into polypropylene contact lens molds and air cured at 80° C. for 1 hour. The molds were opened and the lenses were mechanically removed from the mold half to which it was adhered (i.e. dry-delensed). The lenses were then placed into PBS for 20 minutes at room temperature, then placed into contact lens blisters containing 1.2 ml PBS, sealed and autoclaved. The resulting lenses were optically clear, had an equilibrium water content of about 63%, a Dk of about 40, and had acceptable physical properties and wettability.

The same methods as described above for the formulation of Table 3 were used to make optically clear, dry-delensable lenses of the formulation shown in Table 4 below.

TABLE 4

| Component | Unit Parts by weight |
| --- | --- |
| H10P16 | 25 |
| HEMA | 70 |
| GMA | 0 |
| MA | 4 |

TABLE 4-continued

| Component | Unit Parts by weight |
| --- | --- |
| TEGDMA | 0.5 |
| V52 | 0.8 |
| Water | 15 |

EXAMPLE 6

Preparation and Purification of HEMA-Compatible Polysiloxane, H10P16

41.67 g of the intermediate siloxane of formula 2, 89.10 g of hydroxyl polyethylene glycol allyl ether having an average molecular weight of about 750 (Uniox PKA5004, NOF Corporation), 83.34 g of 2-propanol (super dehydrated) (Wako Pure Chemical Industries), 0.40 g of 10% potassium acetate (Wako Pure Chemical Industries) in ethanol, 0.50 g of 1% butylated hydroxyl toluene in 2-propanol (hereinafter 1% BHT/IPA), and 0.24 g of 1% 6-methoxyquinoline in 2-propanol (hereinafter 1% MQ/IPA) were added into a 300 ml eggplant-shaped flask. To this solution 0.80 g of 1% H2PtCl6/6H2O/IPA was added and stirred at 50° C. for 2 h. After that 0.8184 g of 1% NaHCO$_3$ aq. was added and stirred at room temperature for 1 hour. The reaction mixture was then evaporated and vacuum-dried at 35° C.

The crude mixture was dissolved into 200 g of dichloromethane and 135 g of DI water was added. The solution was vigorously stirred and then centrifuged at 1500 rpm, 5 min and 20° C. After that an upper layer was removed. This operation was repeated 4 times. To the organic layer 135 g of 1% NaCl aq. was added. The solution was vigorously stirred and then centrifuged at 1500 rpm, 5 min and 20° C. Afterwards an upper layer was removed. This operation was repeated 13 times. The organic layer was dried with Na$_2$SO$_4$ and filtrated. The filtrate was evaporated and vacuum-dried. To this solution 0.24 g of 1% BHT in IPA and 0.13 g of 1% MQ in IPA were added and then the solution was evaporated and vacuum-dried at 35° C.

The reaction yielded 73.83 g of a hydrophilic polysiloxane, designated H10P16, having the structure of Formula 3 (above) wherein $R_2$ is a methyl group, m is ~20, n is ~3, and p is ~16.

EXAMPLE 7

Preparation of HEMA-Compatible Polysiloxane, H15E75

202.20 g of octamethylcyclotetrasiloxane (LS8620, Shin-Etsu Chemical), 32.78 of 1,3,5,7-tetramethylcyclotetrasiloxane (LS8600, Shin-Etsu Chemical) and 58.61 g of 1,3-bis(3-methacryloxypropyl)-1,1,3,3-tetramethyldisiloxane (X-22-164, Shin-Etsu chemical) were added into 500 ml kjeldahl (eggplant-shaped) flask. To this solution 0.62 g of trifluoromethanesulfonic acid (Wako Pure Chemical Industries) was added and stirred at 35° C. for 5 h. After that 0.7055 g of magnesium oxide (light) (Wako Pure Chemical Industries) and 100 ml of hexane (anhydrous) were added and stirred for 1 h at room temperature. The reaction mixture was suction filtered through Celite No. 545 (Wako Pure Chemical Industries) and No. 5A KIRIYAMA filter paper. The filtrate was evaporated and vacuum-dried at 35° C. Afterward the reaction mixture was gradually heated up to 165° C. at 1 mmHg for 30 min while stirring, and the low molecule impurity was stripped off from the organic phase under reduced pressure (1 mmHg) at 165° C. for 2 h. The reaction yielded 264.48 g of an intermediate siloxane of Formula 2.

The following were added into a 200 ml eggplant-shaped flask: 10.42 g of the intermediate siloxane of formula 2, 33.43 g of polyethyleneglycol-polypropylene-glycol allyl ether having an average molecular weight of about 750 and a random copolymer EO/PO molar ratio of about 75:20, respectively (Uniox PKA5004, NOF Corporation), 30.01 g of 2-propanol (super dehydrated) (Wako Pure Chemical Industries), 0.10 g of 10% potassium acetate (Wako Pure Chemical Industries) in ethanol, 0.15 g of 1% butylated hydroxyl toluene in 2-propanol, and 0.08 g of 1% p-methoxyphenol (Wako Pure Chemical Industries) in 2-propanol. To this solution 0.20 g of 11% H2PtCl6/6H20/IPA was added and stirred at 50° C. for 2 h; after 1 h of stirring, an additional 0.2 g of 1% H2PtCl6/6H20/IPA was added. Then the reaction mixture was evaporated and vacuum-dried. 0.07 g 1% BHT/IPA and 0.03 g 1% MQ/IPA were added to the dried reaction mixture and the solution was vacuum-dried again. The reaction yielded 22.6069 g of a polysiloxane, designated H15E75-2k, having the structure of Formula 4 (above) wherein $R_2$ is a methyl group, k is 0, m is ~15, n is ~3, p is ~12, q is ~4, and $R_1$ is hydrogen. The siloxane had an HLB value of about 2.8 and a hydroxyl content of about 1.2 wt. %.

EXAMPLE 8

Preparation of Polysiloxane Intermediate 139.68 g of 1,3,5,7-tetramethylcyclotetrasiloxane (LS8600, Shin-Etsu Chemical) and 30.00 g of 1,3-bis(3-methacryloxypropyl)-1,1,3,3-tetramethyldisiloxane (X-22-164, Shin-Etsu chemical) were added into a 500 ml kjeldahl (eggplant-shaped) flask. To this solution 0.60 g of trifluoromethanesulfonic acid (Wako Pure Chemical Industries) was added and stirred at 35° C. for 24 h. After that 0.70 g of magnesium oxide (light) (Wako Pure Chemical Industries) and 150 ml of hexane (anhydrous) were added and stirred for 1 h at room temperature. The reaction mixture was suction filtered through Celite No. 545 (Wako Pure Chemical Industries) and No. 5A KIRIYAMA filter paper. The filtrate was evaporated and vacuum-dried at 35° C. Afterward the reaction mixture was gradually heated up to 100° C. under reduced pressure (2~3 mmHg) while stirring, and the low molecule impurity was stripped off from the organic phase at 100° C. for 2 h, and then 120° C. for 1 h. The reaction yielded 157.86 g of an intermediate siloxane of formula 5:

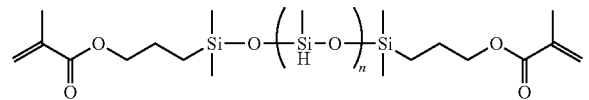

(5)

EXAMPLE 9

Preparation of HEMA-Compatible Polysiloxane, H30P1-5K-NDM 15.00 g of the intermediate siloxane of formula 5, 32.75 g of 2-(allyloxy)ethanol (Wako Pure Chemical Industries), 45.02 g of 2-propanol (super dehydrated) (Wako Pure Chemical Industries), 0.30 g of 10% potassium acetate in ethanol, 1.15 g of 1% BHT/IPA, and 0.08 g of 1% MQ/IPA were added into 300 ml eggplant-shaped flask. To this solution 0.60 g of 1% H2PtCl6/6H20/IPA was added and stirred at 50° C. for 13.5 h. After that the reaction mixture was evaporated and vacuum-dried at 45° C. To this mixture 0.19 g of 1% BHT/IPA and 0.09 g of 1% MQ/IPA were added and then evaporated and vacuum-dried at 45° C. The reaction yielded 35.1547 g of a polysiloxane, designated H30P1-5K-NDM, having the structure of Formula 3 (above) wherein $R_2$ is a methyl group, m is 0, n is ~30, and p is 1. The siloxane had an HLB value of about 7 and a hydroxyl content of about 9.7 wt. %.

EXAMPLE 10

Preparation of HEMA-Compatible Polysiloxane, H30AA-5K 10.02 g of the intermediate siloxane of formula 5, 15.52 g of ally alcohol (Wako Pure Chemical Industries), 25.04 g of 2-propanol (super dehydrated) (Wako Pure Chemical Industries), 0.20 g of 10% potassium acetate in ethanol, 0.10 g of 1% BHT/IPA, and 0.05 g of 1% MQ/IPA were added into 300 ml eggplant-shaped flask. To this solution 0.40 g of 1% H2PtCl6/6H20/IPA was added and stirred at 50° C. for 13.5 h. After that 0.4128 g of 1% NaHCO3 aq. was added and stirred for over 1 h at room temperature. Then the reaction mixture was evaporated and vacuum dried at 35° C. To this mixture about 5 g of acetone and 15 g of DI water were added with vigorous shaking. The mixture was then centrifuged (7000 rpm, 5° C., 10 min). The upper (aqueous) layer was removed. This operation was repeated three times in total. To this mixture 5 g IPA was added and the reaction mixture was evaporated and vacuum-dried at 40° C. Then 0.06 g of 1% BHT/IPA and 0.03 g of 1% MQ/IPA were added and then evaporated and vacuum-dried at 45° C. The reaction yielded 16.6762 g of a polysiloxane, designated H30AA-5K, having the structure of Formula 3 (above) wherein $R_2$ is a methyl group, m is 0, n is ~30, and p is 0. The siloxane had an HLB value of about 3 and a hydroxyl content of about 13 wt. %.

Although the disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

A number of publications and patents have been cited hereinabove. Each of the cited publications and patents are hereby incorporated by reference in their entireties.

The invention further provides:

1. An optically clear silicone hydrogel contact lens comprising: a polymeric lens body that is the reaction product of a polymerizable composition comprising: a) at least 25 wt. % of at least one hydroxyalkyl methacrylate; and b) at least 20 wt. % of at least one HEMA-compatible bifunctional polysiloxane comprising at least 6 siloxane groups, wherein the HEMA-compatible bifunctional polysiloxane has an HLB value of at least 5, or has a hydroxyl group content of at least 1 wt. %, or has both an HLB value of at least 5 and has a hydroxyl group content of at least 1 wt. %.

2. The contact lens of 1, wherein the HEMA-compatible bifunctional polysiloxane has a molecular weight of 1K to 20K.

3. The contact lens of 1 or 2, wherein the HEMA-compatible bifunctional polysiloxane has an elemental silicon content of at least 10 wt. %.

4. The contact lens of any one of 1-3, wherein the HEMA-compatible bifunctional polysiloxane has the structure of Formula 4 (above) wherein $R_1$ and $R_2$ are independently selected from either hydrogen or a methyl group, k is an integer of 0 or 1, m is 0 or an integer of at least 1, 6, 10, 15, 20, or 30 up to about 50, 60, 80, 100, or 160, n is an integer of at least 1, 2, 4, 6, 8, 10, 12, 15, 20 or 30, up to about 6, 10, 20, 30, 40, 60, 75, or 80, p is 0 or an integer of at least 1, 2, 4, 6, 8, 10, 12 or 15, up to about 18, 20, 30, 40, or 60, and q is 0 or an integer of at least 1, 2, 4, or 6 up to about 8, 10, 15 or 20.

5. The contact lens of any one of 1-4, wherein the HEMA-compatible bifunctional polysiloxane has an HLB value of at least 7.

6. The contact lens of any one of 1-4, wherein the HEMA-compatible bifunctional polysiloxane has an HLB value of less than 5 and a hydroxyl group content of at least 1 wt. %.

7. The contact lens of any one of 1-4, wherein the HLB value is from 2 to 4 and hydroxyl group content is from 4 to 8% wt. %.

8. The contact lens of any one of 1-7, wherein the polymerizable composition further comprises: c) 1 to 65 wt. % diluent, wherein the wt. % of the diluent is based on the total weight of the polymerizable composition, and wherein the diluent comprises water, a low molecular weight polyethylene glycol (PEG), or a combination thereof.

9. The contact lens of any one of 1-8, wherein the polymerizable composition further comprises at least 0.1% up to about 5% methacrylic acid or acrylic acid.

10. The contact lens of any one of 1-9, wherein the polymerizable composition comprises at least 35 wt. % of the hydroxyalkyl methacrylate.

11. The contact lens of any one of 1-9, wherein the hydroxyalkyl methacrylate is 2-hydroxyethyl methacrylate (HEMA).

12. The contact lens of any one of 1-11 having a Dk of at least 35.

13. The contact lens of any one of 1-11, wherein the polymerizable composition comprises a monomer selected from methacrylic acid, acrylic acid, glycerol methacrylate, and combinations thereof.

14. The contact lens of 13, wherein the polymerizable composition optionally comprises a crosslinking agent, a polymerizable dye, or both a crosslinking agent and a polymerizable dye, and no other polymerizable components.

15. A method of manufacturing the optically clear contact lens of any one of 1-14, comprising: a) polymerizing the polymerizable composition to form the polymeric lens body; and b) hydrating the polymeric lens body, wherein the polymerizable composition is either diluent-free or comprises about 1 to 65 wt. % of a diluent consisting essentially of water or a low molecular weight PEG, or a combination thereof, wherein the wt. % of the diluent is based on the total weight of the polymerizable composition.

16. The method of 15, wherein the polymeric lens body does not come in contact with a volatile organic solvent during the hydrating step.

17. The method of 15 or 16, wherein the polymerizing step comprises thermal curing in air.

18. The method of any one of 15-17, wherein the polymerizable composition is cured in a mold to form the polymeric lens body, and wherein the polymeric lens body is dry-delensed from the mold prior to hydrating the polymeric lens body.

19. A HEMA-compatible polysiloxane having the structure of Formula 4 (above) wherein $R_1$ is hydrogen, $R_2$ is either hydrogen or a methyl group, k is an integer of 0 or 1, m is 0 or an integer of 1 or 6 up to 10, 30, 50 or 60, n is an integer of at least 1, 2, 4, 6, 8, 10, 12, 15, 20 or 30, up to about 6, 10, 20, 30, 40, 60, 75, or 80, p is 0 or an integer of at least 1, 2, 4, 6, 8, 10, 12 or 15, up to about 18, 20, 30, 40, or 60, and q is 0 or an integer of at least 1, 2, 4, or 6 up to about 8, 10, 15 or 20, wherein the HEMA-compatible bifunctional polysiloxane has an HLB value of at least 5, or has a hydroxyl group content of at least 1 wt. % based on the average molecular weight of the polysiloxane, or has both an HLB value of at least 5 and has a hydroxyl group content of at least 1 wt. %, and wherein the HEMA-compatible bifunctional polysiloxane has a purity of at least 75%.

20. The HEMA-compatible polysiloxane of 19 having a purity of at least 90%.

21. The HEMA-compatible polysiloxane of 19 or 20, wherein the HEMA-compatible bifunctional polysiloxane has an HLB value of at least 7.

22. The HEMA-compatible polysiloxane of 19 or 20, wherein the HEMA-compatible bifunctional polysiloxane has an HLB value of less than 5 and a hydroxyl group content of at least 1 wt. %.

23. The HEMA-compatible polysiloxane of 19 or 20, wherein the HLB value is from 2 to 4 and hydroxyl group content is from 4 to 8 wt. %.

24. The HEMA-compatible polysiloxane of 19 or 20, wherein k is 0.

25. A method of purifying a polysiloxane from a reaction product comprising the polysiloxane and an unreacted polyethylene glycol-containing reagent, said method comprising:

a) combining the reaction product with an organic solvent and water or an aqueous solution to make a mixture; b) equilibrating the mixture into an organic layer and an aqueous layer; and c) discarding the aqueous layer from the organic layer.

26. The method of 25, further comprising: d) combining the organic layer from step (c) with water or aqueous solution and repeating the equilibrating and discarding steps one or more times.

27. The method of 25 or 26, wherein the equilibrating step comprises centrifuging the mixture.

28. The method of any one of 25 to 27 comprising separating the polysiloxane from the organic layer.

We claim:

1. An optically clear silicone hydrogel contact lens comprising:

a polymeric lens body that is the reaction product of a polymerizable composition comprising:

a) at least 25 wt. % of at least one hydroxyalkyl methacrylate; and b) at least 20 wt. % of at least one HEMA-compatible bifunctional polysiloxane comprising at least 6 siloxane groups, wherein the HEMA-compatible bifunctional polysiloxane has an HLB value of at least 7, wherein the wt. % of the hydroxyalkyl methacrylate and the HEMA-compatible bifunctional polysiloxane is based on the total weight of polymerizable monomers in the composition.

2. The contact lens of claim 1, wherein the HEMA-compatible bifunctional polysiloxane has the structure of Formula 4:

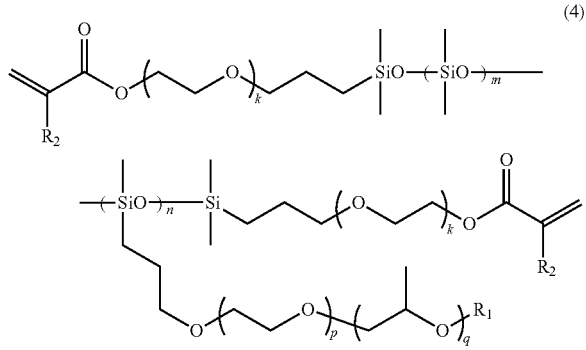

(4)

wherein $R_1$ and $R_2$ are independently selected from either hydrogen or a methyl group, k is an integer of 0 or 1, m is an integer of 0 to 160, n is an integer of 1 to 75, p is an integer of at least 6, and q is an integer of 0 to 20.

3. The contact lens of claim 1, wherein the HEMA-compatible bifunctional polysiloxane has a hydroxyl group content of at least 1 wt. % based on the average molecular weight of the polysiloxane.

4. The contact lens of claim 1, wherein the polymerizable composition further comprises:
c) 1 to 65 wt. % diluent, wherein the wt. % of the diluent is based on the total weight of the polymerizable composition, and wherein the diluent comprises water, a low molecular weight polyethylene glycol (PEG), or a combination thereof.

5. The contact lens of claim 4, wherein the HEMA-compatible bifunctional polysiloxane requires water addition for optical clarity.

6. The contact lens of claim 1, wherein the polymerizable composition comprises from 0.1 wt. % up to about 5 wt. % methacrylic acid or acrylic acid.

7. The contact lens of claim 1, wherein the polymerizable composition comprises at least 35 wt. % of the hydroxyalkyl methacrylate.

8. The contact lens of claim 1, wherein the hydroxyalkyl methacrylate is 2-hydroxyethyl methacrylate (HEMA).

9. The contact lens of claim 1, having a Dk of at least 35.

10. The contact lens of claim 1, wherein the polymerizable composition comprises a monomer selected from methacrylic acid, acrylic acid, glycerol methacrylate, and combinations thereof.

11. The contact lens of claim 10, wherein the polymerizable composition optionally comprises a crosslinking agent, a polymerizable dye, or both a crosslinking agent and a polymerizable dye, and no other polymerizable components.

12. A method of manufacturing the optically clear contact lens of claim 1, comprising:
a) polymerizing the polymerizable composition to form the polymeric lens body; and
b) hydrating the polymeric lens body,
wherein the polymerizable composition is either diluent-free or comprises about 1 to 65 wt. % of a diluent consisting essentially of water or a low molecular weight PEG, or a combination thereof, wherein the wt. % of the diluent is based on the total weight of the polymerizable composition.

13. The method of claim 12, wherein the polymerizable composition is cured in a mold to form the polymeric lens body, and wherein the polymeric lens body is dry-delensed from the mold prior to hydrating the polymeric lens body.

* * * * *